UNITED STATES PATENT OFFICE.

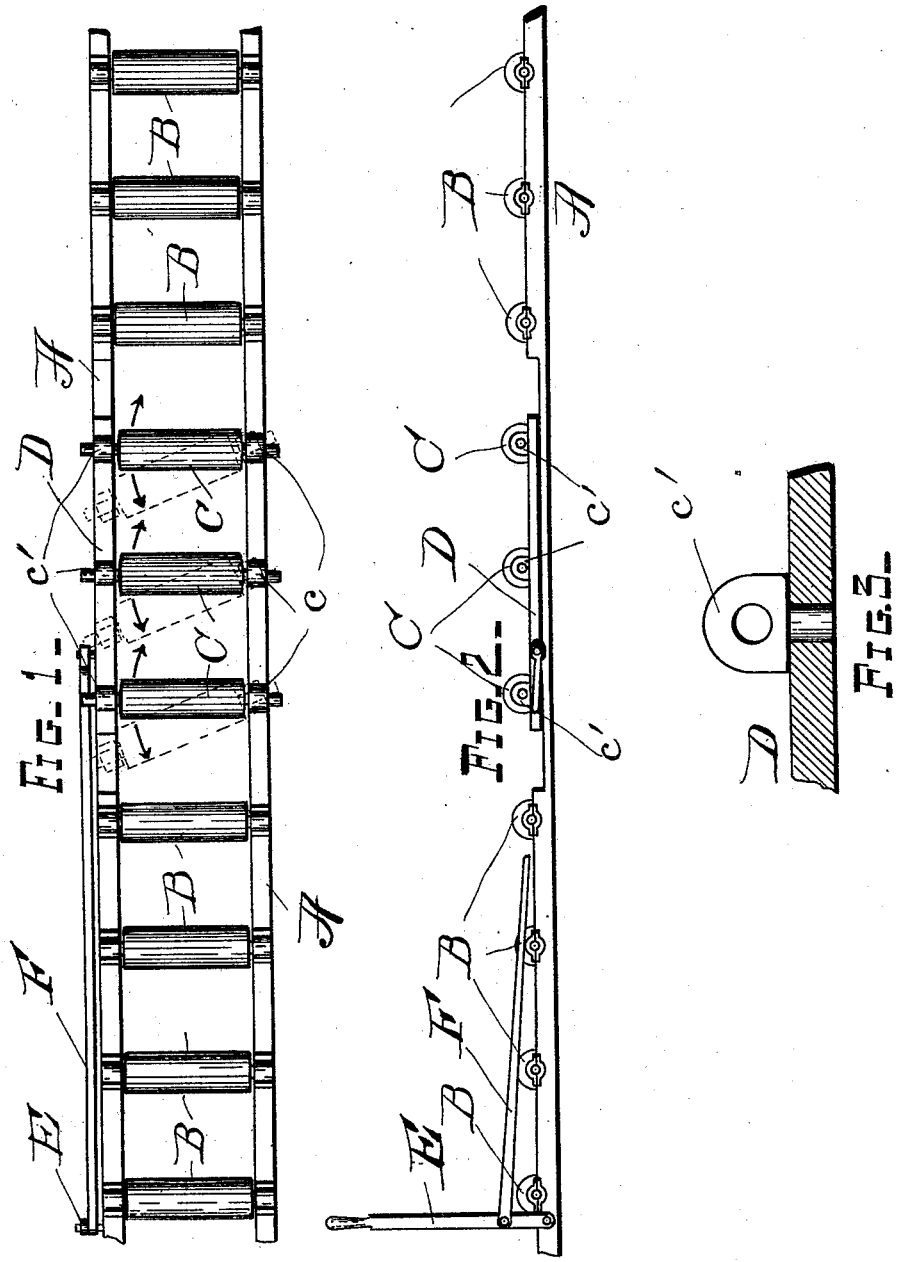

MICAJAH M. FORD, OF DALLAS, AND HARDY N. REVELLE, OF BUCHANAN, GEORGIA; SAID FORD ASSIGNOR TO SAID REVELLE.

LUMBER-WAY.

SPECIFICATION forming part of Letters Patent No. 422,389, dated March 4, 1890.

Application filed December 16, 1889. Serial No. 333,980. (No model.)

*To all whom it may concern:*

Be it known that we, MICAJAH M. FORD, of Dallas, county of Paulding, and HARDY N. REVELLE, of Buchanan, in the county of Haralson and State of Georgia, have invented certain new and useful Improvements in Lumber-Ways; and we do declare the following to be a full, clear, and exact description of the invention, which will enable others skilled in the art to which it appertains to make and use the same, reference being had to the accompanying drawings, and to letters of reference marked thereon, which form a part of this specification.

This invention relates to means for transportation and deposit of lumber from the mill and in piles at any desired place within the yard, from which piles it may be removed and repiled in shape for storage or hauled away, the object being to quickly carry it out of the way of the saws and sawyer's operatives and place it in such a position as to be easy of access. The means whereby this end may be accomplished are hereinafter fully explained.

In the accompanying drawings, Figure 1 is a plan of the device, showing the rollers both stationary and swiveled, and indicated by dotted lines in one of the positions assumed by the swiveled rollers when so directed. Fig. 2 is a side elevation of the device, showing the same parts as are shown in Fig. 1 and further exhibiting their construction, the pitman being partly broken away. Fig. 3 is a detail of one of the swiveled journals and the movable bar in which it is pivoted.

In the figures, like reference-marks indicating corresponding parts in the several views, A is the bed or base, which is composed of stringers of any desired material, and a suitable support for the same, and, if desired, a suitable structure for elevating the way to any desired height at which it is desired to form the piles of lumber. The drawings show a section of this way, said section, however, being merely duplicated to any desired length to produce a device capable of forming any number of piles of lumber, all the parts shown in the drawings being duplicated for that purpose. This bed or base A carries rollers B, whose axes are fixedly at right angles thereto when the way is straight, and at a proper angle when the way is curved, to carry the lumber around said curve with no danger of its being thrown off. These rollers B may be revolved by means of pulley-and-belt connection with a suitable motor, or they may be driven by contact with the board traveling over them and said board be properly propelled, as desired, without a departure from the spirit of this invention. These rollers B are to be placed at the positions in the lumber-way at which it is never desired to throw off the lumber from said way, and at places where the lumber is to be so thrown off the swiveling rollers C are placed in as large numbers and for as great a distance in the ways as is desired. The ends of these rollers on one side of the base are carried in swiveled journal-boxes $c$, pivoted in the base-frame on that side, and the other ends of the said rollers are journaled in swivel-boxes $c'$, which are pivoted in the longitudinally-reciprocating bar D, the journal-bearings on that end of the rollers B being sufficiently long to allow of play through the said journal-boxes $c'$. The bar D is placed on top of one of the stringers of the way, which is cut down to receive it, and is provided with suitable guides to prevent lateral play, and is capable of reciprocation in both directions from its position when the rollers C are at a right angle to the said bar, in order that the lumber may be thrown from either side of the way at the will of the operator. This bar D may be reciprocated in any suitable manner, the preferred form, however, being as shown in the accompanying drawings, in which it connects with the lever E by the pitman F, which is thrown in either direction from a perpendicular, as desired. This lever E would be preferably placed near the saw-mill, so as to be under easy control of the person operating the same; but this is obviously immaterial, as it might be placed in any place desired without departure from the spirit of this invention.

As shown by the dotted lines in Fig. 1, the lumber would be thrown off on the left hand of the way, while were the rollers inclined at an angle opposite that shown it would be thrown off at the other end, and still another pile could be formed by allowing the rollers to be parallel with the stationary ones, and so throw the lumber off at the end of the way, one pile being formed of newly-sawed lumber while the operatives are removing that from the other, thus obviating any delay or danger of accident.

Having thus described our invention, what we claim as new, and desire to secure by Letters Patent of the United States, is—

1. In a device of the class described, the base or bed A, the rollers B and C, mounted on said base or bed, said rollers C being mounted at one end in swivel-boxes pivoted in said base or bed and mounted at the other end in swivel-boxes pivoted in a bar D, adapted to be reciprocated on the bed or base, substantially as and for the purpose set forth.

2. In a device of the class described, the base or bed A, the rollers C, journaled at one end in the swivel-boxes $c$, pivoted in the said base or bed and at the other end in the swivel-boxes pivoted in the reciprocating bar D, mounted on said base or bed, and the mechanism for operating said bar, consisting of the pitman F, attached to the same, and the lever E, substantially as and for the purpose specified.

In testimony whereof we have hereunto affixed our signatures this the 25th day of November, 1889.

MICAJAH M. FORD.
HARDY N. REVELLE.

Witnesses:
 JOE W. KELLEY,
 S. M. DAVENPORT.